(Model.)
F. B. LIPPINCOTT.
APPARATUS FOR PURIFYING SEWERS.
No. 244,907. Patented July 26, 1881.
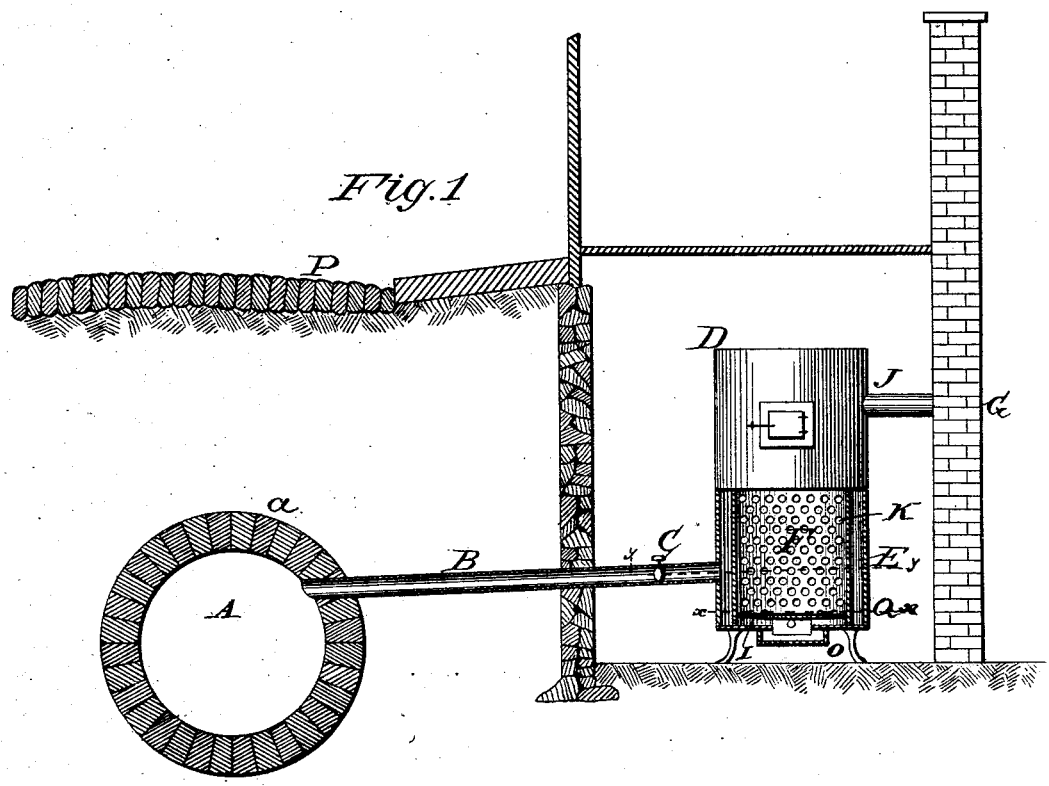
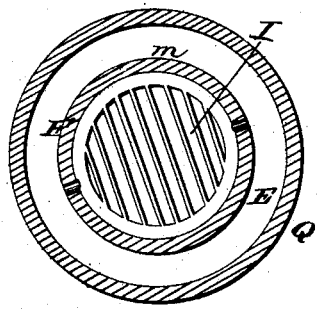
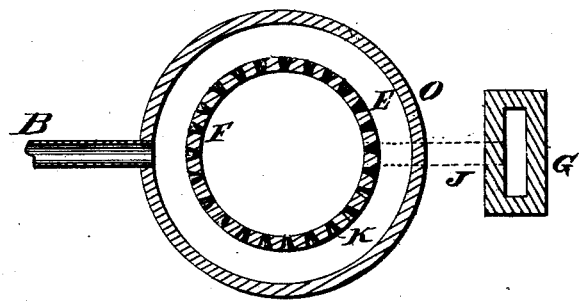

UNITED STATES PATENT OFFICE.

FRANKLIN B. LIPPINCOTT, OF ATLANTIC CITY, NEW JERSEY.

APPARATUS FOR PURIFYING SEWERS, &c.

SPECIFICATION forming part of Letters Patent No. 244,907, dated July 26, 1881.

Application filed September 4, 1880. (Model.)

*To all whom it may concern:*

Be it known that I, FRANKLIN B. LIPPINCOTT, of Atlantic City, in the county of Atlantic and State of New Jersey, have invented an Improvement in Processes and Apparatus for Purifying Sewers, &c., of which the following is a specification, reference being had to the accompanying drawings, which form part thereof.

My invention has reference to the purification of sewers, cesspools, and any and all apartments or receptacles which are charged with or contain any deleterious or noxious gases or vapors; and it consists in feeding said gases or vapors in streams or jets into a coal or other fire, or into the flame arising therefrom, and burning said noxious and deleterious gases and vapors, producing gases which are practically not injurious to the system, and causing said products of combustion to be distributed in the atmosphere; further, in apparatus to carry on said process, and which is fully set forth in the following specification, shown in the accompanying drawings, and referred to in the appended claims.

The object of my invention is to purify the atmosphere of cities, towns, villages, manufactories, chemical and dye works, hospitals, public halls and buildings, and, in a word, to prolong life and render it more enjoyable to those individuals and communities who do not and cannot obtain their fair share of pure atmosphere.

Heretofore it has been attempted to burn sewer-gas by passing it in large volume into a furnace, as shown and described in the patent to Alexander, of December 3, 1878, and also by causing a jet of sewer-gas to pass into a gas-burner jet; but this is equivalent to passing a large stream of the sewer-gas into a large flame, and the gas-flame is not of sufficient temperature to cause the decomposition of the gases. This process was set out in the patent to Corbett, December, 1877; but owing to the nature of their processes the result desired cannot be accomplished unless the sewer-gas is admitted to the fire and its flame in extremely small streams or jets. Thus with one fire I would have, say, five hundred jets, whereby each jet is extremely small in comparison with the fire.

In the drawings, Figure 1 is a sectional elevation of part of a building provided with my improved apparatus, and shows its connection with the sewer, which is shown in cross-section. Fig. 2 is a cross-section of apparatus on line $x\,x$. Fig. 3 is a cross-section of same on line $y\,y$.

A is the sewer. B is a pipe leading from the top of said sewer to or near the bottom of apparatus D. The apparatus D is preferably located in the cellar of the building, and consists of an inner and outer shell closed at top and bottom, and leaving an annular space, E, between them. The outer shell, Q, is made of sheet iron and is gas-tight, and the inner shell, F, is provided with perforations or apertures throughout part or all of its surface, said apertures being conical or cylindrical in shape, the small ends being directed inward and connecting the space within the shell F, which constitutes the fire-box, with the annular space E for the reception of the noxious and deleterious gases and vapors which pass from the sewer A through pipe B, and the supply of which may be regulated by the valve C. These conical or cylindrical apertures K are directed toward the fire and flame, and those near the bottom of shell F may be horizontal, while those above may be directed downward.

In place of using conical apertures, I may use ordinary polygonal prismatic holes. These shells may be made of sheet or cast iron, brick, or clay, or any combination of these, and are joined at top and bottom to form a closed annular receptacle, E. The top of the shell F is also curved to form the crown-sheet of the fire-box.

Situated in the bottom of the shell F are the grate-bars I, which may be of any desired construction, and beneath said grate-bars is the ash-pit O. The combustion-chamber of said apparatus is connected with the chimney or smoke-stack G by pipe J.

I do not confine myself to the exact construction shown, as the shape or detailed construction of the apparatus is of secondary importance, the broad feature of my invention being the feeding of noxious and deleterious gases and vapors to a fire or flame in jets or small streams.

The operation is as follows: A fire being built upon the grate-bars I, the valve C is opened, admitting as much of the gases from the sewer as desired to the annular space E, from which it passes into the fire-box in small jets through the conical apertures K, where they meet the flame and products of combustion of the coal, burning the said gases and generating gases of a harmless character, which commingle with the products from the fire and pass off through the pipe J into the stack G, and finally pass into the atmosphere. It is impossible to burn the gases by a fire or flame, unless said gases are fed to said fire or flame in small jets or streams, as hereinbefore set forth.

It is immaterial to my invention where or in what manner the noxious gases are generated or in what manner they are fed in jets, for the apparatus should be especially adapted to the place and purpose.

I am aware of the patent to Gregory, April 14, 1868, and do not claim anything therein shown or described.

Having now described my invention, what I claim as new, and desire to secure by Letters Patent, is—

1. The herein-described method for the purification of sewers, &c., consisting in passing the gases arising therefrom in small jets or streams into a fire, or flame arising from said fire, whereby said gases are brought in intimate contact with a proportionally greater quantity of heat, thereby insuring the perfect combustion of the impure sewer-gas, substantially as and for the purpose specified.

2. In an apparatus for burning noxious gases, &c., the combination of an inner perforated shell, F, an outer shell, Q, an unobstructed annular space, E, a fire-box located within shell F, provided with means for producing combustion or sustaining a fire, an inlet-pipe, B, in communication with the sewer A, and annular space E, which may be provided with a valve, and an exit-pipe, J, in communication with the combustion-chamber or fire-box, substantially as and for the purpose specified.

3. In apparatus for burning noxious gases, &c., the inner perforated shell, F, outer shell, Q, and unobstructed annular space E, in communication with the sewer A, in combination with a combustion-chamber located within shell F, and an exit-flue from said combustion-chamber, substantially as and for the purpose specified.

4. In apparatus for burning noxious gases, &c., the shell F, provided with conical apertures K, the smaller openings of said apertures being directed toward the interior of said shell, in combination with a combustion-chamber located within said shell F, said apertures being the exit from a cavity about said shell, which is in communication with the sewer or drain by a suitable pipe, substantially as and for the purpose specified.

F. B. LIPPINCOTT.

Witnesses:
HARRY L. SLAPE,
THEODORE F. WUSTE.